United States Patent [19]

Bogner et al.

[11] 4,339,681
[45] Jul. 13, 1982

[54] SUPERCONDUCTING FIELD WINDING FOR THE ROTOR OF AN ELECTRIC MACHINE

[75] Inventors: Günther Bogner, Erlangen; Dieter Kullmann, Langenzenn, both of Fed. Rep. of Germany

[73] Assignee: Siemens Aktiengesellschaft, Berlin and Munich, Fed. Rep. of Germany

[21] Appl. No.: 716,221

[22] Filed: Aug. 20, 1976

[30] Foreign Application Priority Data

Sep. 22, 1975 [DE] Fed. Rep. of Germany ....... 2542169

[51] Int. Cl.$^3$ .............................................. H02K 3/04
[52] U.S. Cl. ...................................... 310/201; 310/52; 310/261
[58] Field of Search ................... 310/10, 198, 40, 194, 310/52, 201, 205, 208, 42, 180, 202, 184, 261, 179, 264, 265, 269, 270; 336/DIG. 1

[56] References Cited

FOREIGN PATENT DOCUMENTS 1042089 10/1958 Fed. Rep. of Germany ...... 310/198

*Primary Examiner*—R. Skudy
*Attorney, Agent, or Firm*—Kenyon & Kenyon

[57] ABSTRACT

A superconducting field winding for the rotor of an electric machine having several winding sections, the conductors of which each have a predetermined permissible bending radius which is larger than the bending radius provided at the coil heads of the winding section, wherein two associated conductor sections of a winding section are always electrically connected at at least one coil head by means of a prefabricated yoke-like conductor element whereby conductors with relatively large conductor cross section need not be subjected to excessive tensile stresses at the coil heads thereby avoiding damage to their superconducting material.

4 Claims, 4 Drawing Figures

SUPERCONDUCTING FIELD WINDING FOR THE ROTOR OF AN ELECTRIC MACHINE

BACKGROUND OF THE INVENTION

This invention relates to superconducting field windings for electric machines in general and more particularly to an improved winding of this type.

In one type of turbo generator, the field winding is subdivided into several winding sections, each forming a pole, having lateral parts extending parallel to the longitudinal axis of the rotor and curved coil heads. The conductors of the winding are at least partially arranged in slots of the rotor and each have a predetermined, permissible bending radius which is larger than the bending radius provided at the coil heads.

The use of superconducting field windings such as these in electric machines makes possible a substantial increase of the induction in the air gap between a rotating machine part, called a rotor, and a stationary machine part, the stator. Furthermore, with what are known as high field superconductors in particular, high induction values can be produced with practically lossless excitation of the field winding even without the use of magnetic iron in the stator since these conductors can be operated with very high current densities. Because of the absence of magnetic iron in the stator, the ampere-turns in the normally conducting stator winding can also be increased considerably with the same machine dimensions. In such machines with superconducting field windings, the ratio of power to volume and weight is therefore substantially higher than in a machine of conventional design. Its rotor generally contains a hollow cylindrical support body of nonmagnetic material which may be provided with slots on its inside or outside. The conductors of the superconducting field winding are arranged in these slots (See U.S. Pat. No. 3,679,920). The field winding may be wound as a dipole or quadrapole coil and is then subdivided into two or four winding sections, each of which forms a pole. Each of these winding sections has two lateral parts extending parallel to the longitudinal axis and two curved coil heads. The lateral parts of the winding at least may be embedded in slots in the rotor body.

While niobium-tantalum multicore conductors with copper stabilization are generally preferred as conductors for medium size machines, the rating of which goes up to about 1000 MVA, multicore conductors of the intermetallic compounds vanadium-gallium or niobium-tin, which are stabilized, for instance, by copper-tin-bronze or copper, must be provided for machines of still larger ratings. For, superconductors which can carry currents of 10 to 50 kA at maximum flux densities of more than 7.5 Telsa, must be provided for the superconducting field windings of such turbo generators with large ratings. At such flux densities, the current densities of these superconductors including their stabilization material are about $10^4$ A/cm$^2$, so that cross sections of the order of 1 to 5 cm$^2$ are obtained for these conductors.

For fabricating such a field winding, the conductors of a lateral part of a winding section must always be brought out of the longitudinal slots of the rotor body and returned into the corresponding slots of the adjoining lateral part of the winding section. For reasons of space and particularly in order to obtain a packing of these conductors which is as dense as possible, even at the coil heads of the winding sections, small radii of curvature must be provided for the conductors. If superconducting single conductors with large conductor cross sections are used, however, these bending radii are generally smaller than the permissible bending radii of the conductors. If one goes below these radii, damage, for instance, layered fractures of the superconductor material, can be expected. Furthermore, depending on the superconductor material, important physical properties, e.g. the high current carrying capacity, are reduced in superconductors with excessive bending and tensile stresses. For this reason, expensive measures are provided in the known turbo generator designs, so that the individual winding sections of the field winding can be fabricated with tolerable machanical stresses.

It is further known to fabricate field windings of superconducting conductor materials such as niobium-tin ribbons, niobium-titanium wires or of thin wires woven into cables or ribbons. Although such conductor materials are more flexible than individual wires with a large conductor cross section, only a smaller current density is obtained with them because of their smaller filling factor.

In a continuous winding of compact conductors with a relatively large cross section, e.g., a cross section of more than $\frac{1}{2}$ cm$^2$, there is therefore danger, particularly in the region of the coil heads of the winding sections, of damaging the superconductors and thus, of a corresponding reduction of the current carrying capacity. This danger is particularly high where multicore conductors of the intermetallic compounds vanadium-gallium or niobium-tin are used.

SUMMARY OF THE INVENTION

It is therefore an object of the present invention to provide a superconducting field winding for the rotor of an electric machine, in which these dangers are not present or in which they remain only to a smaller extent.

In the field winding of the general type described above, this problem is solved in accordance with the present invention by the provision that two associated conductor sections of adjacent lateral parts of a winding section are always connected at at least one coil head electrically by means of a prefabricated, yoke-like conductor element.

The advantages of the invention are that, particularly for superconducting field windings of machines of large ratings, the conductors of which have correspondingly large cross sections, the conductor elements provided for the coil heads can be preformed before the field winding is assembled without being subjected to excessive tensile stresses, under which their superconducting material could get damaged. The preformed conductor elements then need only be connected to the conductor sections arranged in the longitudinal slots of the rotor body in such a manner that the contact resistance between these conductor sections and the conductor elements is relatively low, for instance, less than $10^{-8}$ ohm. For making the electrical connection between the conductor sections and the conductor elements, the contact areas between the yoke-like conductor element and the conductor sections connected to it can advantageously be chosen larger than the cross section areas of the conductor sections.

According to a further feature of the field winding according to the present invention, two associated conductor sections from adjacent lateral parts of a winding section, together with a yoke-like conductor element in the region of a coil head, are always prefabricated to form a joint conductor assembly and the free ends of the conductor sections are connected at the other coil head to two further conductor sections by means of prefabricated, yoke-like conductor elements. Especially if vanadium-gallium or niobium-tin multicore conductors are used, which can be manufactured using what is known as the solid state diffusion process described, for instance, in the literature reference "Zeitschrift fuer Naturforschung", vol. 27a (1972), pages 1462 to 1467, or in "Appl. Phys. Lett." vol. 25 (1974), pages 624 to 627, the conductor assembly can advantageously be mechanically formed to the shape of the coil head and the shape of the slots prior to a diffusion anneal, when the material is still ductile.

DETAILED DESCRIPTION OF THE INVENTION

Figure 1:
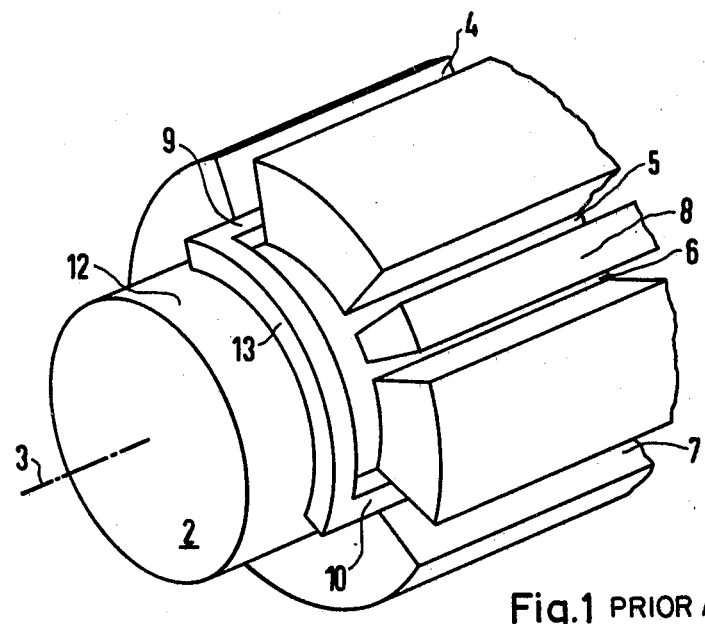
FIG. 1 is a perspective view of the end face of a rotor with a conductor of a field winding partially illustrated.

A portion of the cylindrical rotor 2 of a multiple pole electric machine, for instance, a turbo generator, is illustrated by the perspective view of FIG. 1. It contains a superconducting magnet coil, which is subdivided into several winding sections as the rotating field winding. The winding sections are arranged side by side in the circumferential direction of the rotor 2 and are elongated in the lengthwise direction of the rotor. Each of these winding sections forms a pole of the magnet coil. For instance, a dipole winding then has two and a quadrapole winding four such winding sections. Each of these winding sections are divided into two lateral parts extending parallel to the longitudinal axis 3 of the rotor 2 and two curved coil heads. The conductors of the lateral parts of the winding sections are arranged in corresponding longitudinal slots in the rotor body 2, of which only four slots 4 to 7 are indicated in the figure. The slots may, for instance, be milled into the rotor body from the outside, parallel and symmetrically to a pole core 8.

In the figure, only a single conductor of a winding section with a given rectangular cross section is indicated. This conductor contains two conductor sections 9 and 10, which are arranged in the slots 4 and 7. On its end face in the vicinity of the coil head of the winding section, the rotor body is turned down to a smaller diameter which corresponds to the diameter of the bottom surfaces in the slots 4 to 7. In this portion of the rotor body, designated as 12, the conductor section 9 is brought out of the slot 4, angled off to form a conductor element 13 extending in the circumferential direction on the rotor body portion 12 and is returned into the slot 7 in the longitudinal direction of the rotor as the conductor section 10.

For the winding section of such a field winding, bars of stabilized superconducting material which can carry currents of, for instance, 10 kA to 50 kA at maximum flux densities of 7.5 Tesla or more are provided as the conductor sections 9 and 10 and the conductor element 13. The current densities in the corresponding superconductors including their stabilization material are then about $10^4$ kA/cm$^2$. In such a case the conductors of the field winding must have cross sections of at least 1 cm$^2$.

If, as shown in the figure, such a conductor with a relatively large cross section, for instance, the conductor section 9, is brought out of the slot 4 onto the rotor body portion 12 and angled off toward the conductor section 13 in the circumferential direction for space reasons and in order to achieve maximum density packing of the individual conductors of the winding sections at the coil heads, radii of curvature are then required which are below the mechanically permissible radii of curvature of the large area conductors used. Particularly where stabilized multicore conductors of the intermetallic compounds vanadium-gallium and niobium-tin are used, the danger of damaging the superconductors exists.

Figure 2:
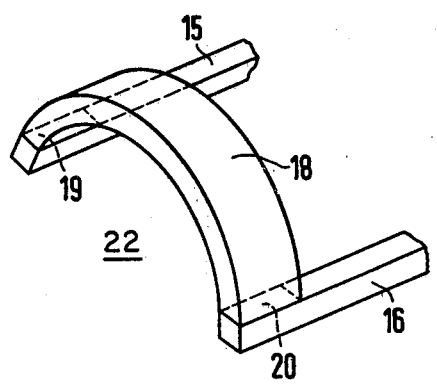
FIG. 2 illustrate in perspective an embodiments of yoke-like conductor elements of such a field winding in accordance with the present invention.

The present invention avoids this danger by using a prefabricated and preformed yoke-like conductor element. Such is illustrated by FIG. 2 where only the ends of two conductor sections 15 and 16 are shown. These correspond, for instance, to the conductor sections 9 and 10 of FIG. 1 and protrude from axis-parallel slots in a rotor body. These conductor sections have rectangular or trapezoidal cross sections and are joined together in an electrically conducting manner by means of a yoke-like conductor element 18. The conductor sections 15 and 16 may be soldered, welded or even bolted to the conductor element 18. The conductor element 18 consists of a conductor section which also has a rectangular or trapezoidal cross section which extends in the circumferential direction of the rotor and is arranged on the cylindrical surface of an appropriate portion of the rotor body, e.g., the rotor body portion 12 of FIG. 1. Its end faces 19 and 20 are disposed flush on the large upper sides of the conductor sections 15 and 16.

The space available at the coil heads of the winding sections permitting, the yoke-like conductor elements can be laid out with larger conductor cross sections than the corresponding adjoining conductor sections, as far as stabilization as well as current carrying capacity is concerned.

In the embodiment of FIG. 2 the yoke-like conductor element 18 has a cross section area which is larger than the cross section areas of the conductor sections 15 and 16 so that correspondingly small contact resistances between the end faces 19 and 20 of the conductor element 18 and the conductor sections 15 and 16 are obtained. With sufficiently large contact areas 19 and 20, the value of the contact resistance between the conductor element and the conductor sections connected to it can be kept so low that the total number of the contacts required for a winding section of the superconducting field winding represents only a relatively small heat load for the required cooling of the winding section. For a conductor with a 10 kA current carrying capacity, a contact resistance of $10^{-8}$ ohm can thus be obtained, which leads to a relatively small heat load.

Figure 3:
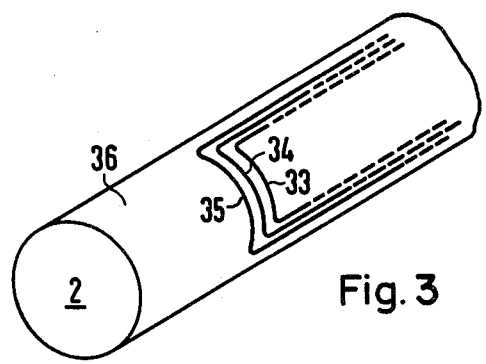
FIG. 3 is a schematic perspective view of an arrangement of several conductor elements of FIG. 2 at a coil head.

In FIG. 3, three yoke-like conductor elements 33 to 35 located at the coil head of a winding section of a field winding are illustrated in schematic form. These conductor elements correspond to the conductor element 22 of FIG. 2. The axis-parallel conductor sections joined to these conductor elements 33 to 35 are partially indicated in the figure by dashed lines. However, the longitudinal slots in the rotor body required to receive them are not shown. The yoke-like conductor elements are generally fastened parallel to each other on a cylindrical rotor body section 36 and are arranged mutually staggered in the axial direction in the region of the coil ends for space reasons and to avoid field peaks. For this purpose, suitably arranged slots may also be provided, for instance, at the coil heads. One can therefore obtain a shape for the winding sections at its coil head also that is advantageous from a cooling point of view and is mechanically stable.

Figure 4:
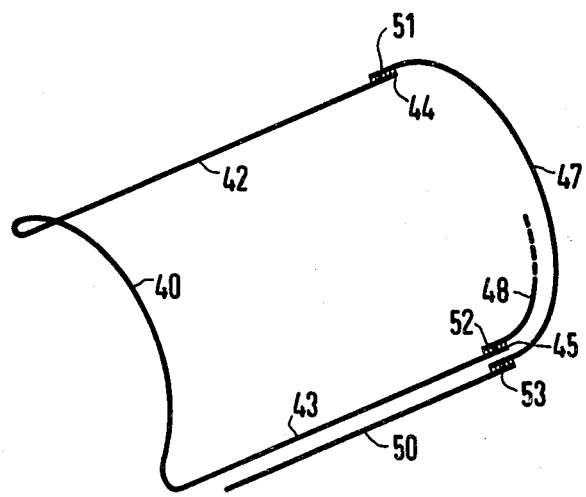
FIG. 4 illustrates in schematic perspective view a further embodiment of conductors and conductor elements of a field winding according to the present invention.

In the fabrication of a winding section of a superconducting field winding in accordance with the foregoing FIGS. 2 to 3, it is assumed that two straight conductor sections are first embedded in axis-parallel slots of a rotor body and that they are then joined together at their two ends in the region of the coil heads by means of prefabricated yoke-like conductor elements. According to the embodiment of FIG. 4, however, it is also possible to first prefabricate and preform one respective yoke-like conductor element 40 of a coil head together with the straight conductor sections 42 and 43 associated with it, which run in slots parallel to the axis, to form a joint subconductor, and then to connect the still free ends 44 and 45 of the axis-parallel conductor sections 42 and 43 at the opposite coil head to the associated further axis-parallel conductor sections by means of prefabricated conductor elements 47 and 48 such as those of FIG. 2. In FIG. 4, only one further conductor section 50 which is connected to the conductor element 47, as well as three contacts 51 to 53 are indicated. With this embodiment of the conductors of a winding section of a magnet coil, contact between yoke-like conductor elements and axis-parallel conductor sections is therefore required only at one coil head. The number of contacts and the corresponding labor for connecting the yoke-like conductor elements to the axis-parallel conductor sections is therefore reduced accordingly. Especially if stabilized multicore conductors of the intermetallic compounds vanadium-gallium or niobium-tin which can be produced by means of a diffusion process in a solid body are used, a superconducting magnet coil can advantageously be built up with several winding sections in accordance with the embodiment of FIG. 4. For, the yoke-like conductor element 40 and its conductor sections 42 and 43 connected to it can be mechanically formed to the shape of the coil head and the shape of the slots prior to a diffusion anneal, while the material is still ductile. The finished subconductor consisting of the conductor sections 42 and 43 and the yoke-like conductor element 40 can then be arranged on the rotor body after the diffusion anneal.

The superconducting field winding according to the present invention is suitable for rotors of electric machines, particularly turbo generators. Similar windings can be provided, however, generally for any arrangement where large radii of curvature occur at the conductors in the region of the coil heads and therefore, danger of damage to the superconducting material of the conductors exists.

We claim:

1. A superconducting field winding for the rotor of an electric machine, the electric machine rotor including a plurality of slots into which winding sections may be placed and including a cylindrical end portion having a radius at least approximately equal to the radius of the slot bottom comprising:

a plurality of winding sections made of conductors of a stabilized superconducting material, said conductors having a predetermined permissable bending radius which is greater than the radius at said end portion of said rotor, each winding section forming a pole and including:

lateral parts disposed in the slots in said rotor extending parallel to the longitudinal axis of the rotor;

pre-fabricated, yoke-like conductor elements made of said stabilized superconducting material prefabricated having a curvature equal to the radius of said rotor end portion connecting conductors of associated lateral parts of a winding section; and, contact surfaces between each yoke-like conductor element and the conductors of the lateral parts connected to it, said contact surfaces being larger than the cross sectional area of the conductors of the lateral parts.

2. Apparatus according to claim 1 wherein the cross sectional area of the yoke-like conductor element is larger than the cross sectional area of the lateral parts connected to it.

3. Apparatus according to claim 1 wherein said lateral parts comprise adjacent lateral parts of a winding section forming a joint, prefabricated subconductor in one piece in the region of one coil head, and additional prefabricated, yoke-like conductor elements connecting the free ends of the lateral parts to corresponding associated lateral parts at the other coil end.

4. Apparatus according to claim 1 wherein said prefabricated yoke-like lateral parts is a pre-fabricated yoke-like conductor element pre-formed to the radius of said end portion.

* * * * *